Oct. 29, 1946.　　　A. G. GROSS　　　2,410,342
REFRIGERATION
Filed Nov. 16, 1942　　　2 Sheets-Sheet 1
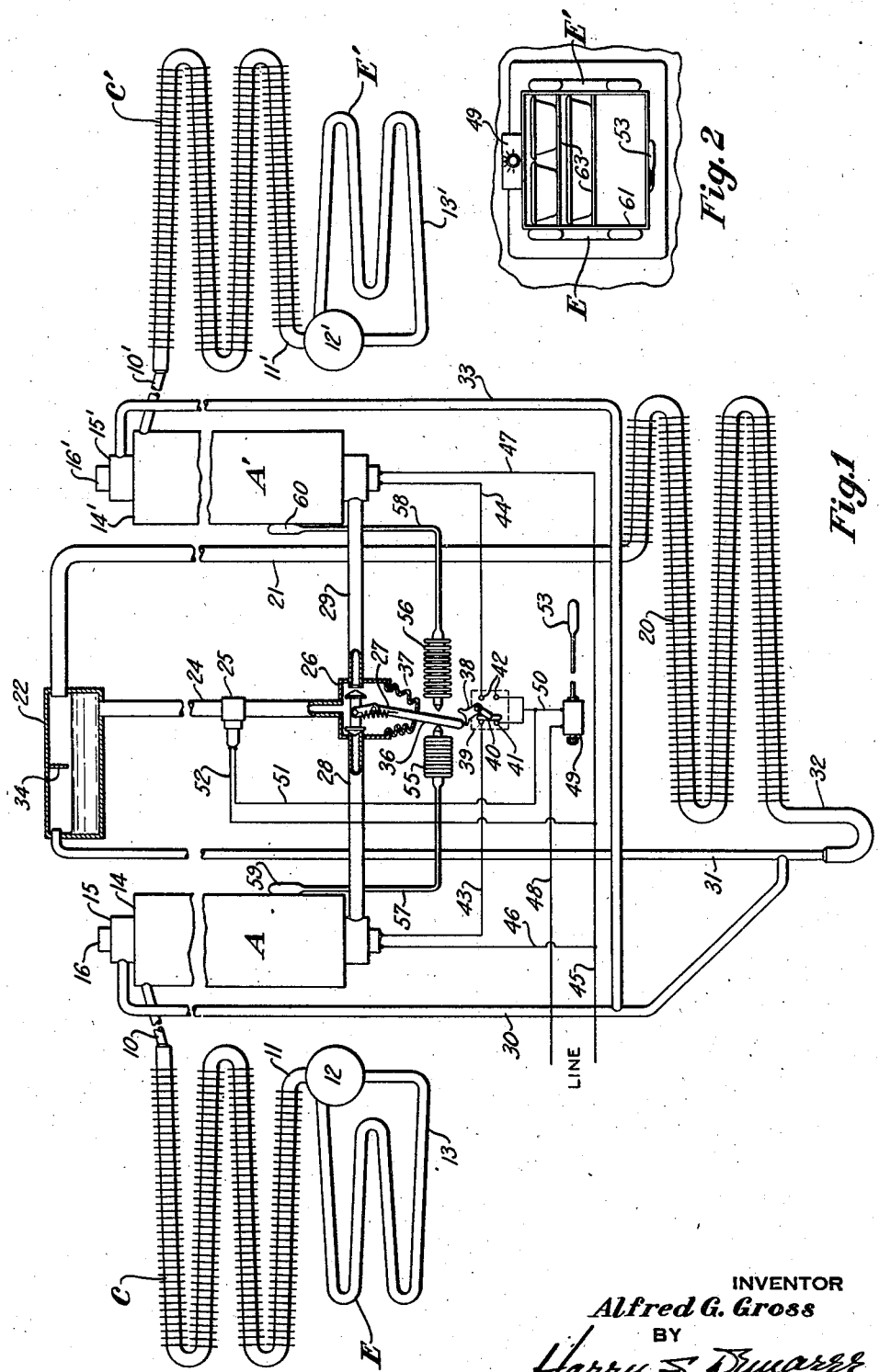
INVENTOR
*Alfred G. Gross*
BY
*Harry S. Demaree*
ATTORNEY Oct. 29, 1946.    A. G. GROSS    2,410,342
REFRIGERATION
Filed Nov. 16, 1942    2 Sheets-Sheet 2

INVENTOR
Alfred G. Gross
BY
Harry S. Dumars
ATTORNEY

Patented Oct. 29, 1946

2,410,342

UNITED STATES PATENT OFFICE 2,410,342

REFRIGERATION

Alfred G. Gross, Wilmette, Ill., assignor to The Hoover Company, North Canton, Ohio, a corporation of Ohio Application November 16, 1942, Serial No. 465,686

8 Claims. (Cl. 62—5)

This invention relates to the art of refrigeration and more particularly to an air cooled absorption refrigerating apparatus of the dual intermittent type.

Heretofore considerable difficulty has been experienced in the design and operation of intermittent absorption refrigerating apparatuses of the type utilizing a dry salt absorbent because of the fact that the absorbing salt is destroyed or poisoned if contacted by refrigerant in the liquid state. Further difficulties have been encountered in providing an adequate cooling system for the absorber generators and arrangement of the apparatus with respect to a conventional domestic refrigerator cabinet because the cooling system for the absorber-generators has had a heat rejecting element at an elevation above the absorber-generators.

It is accordingly a principal object of the present invention to provide an intermittent absorption refrigerating apparatus in which the absorber-generator may be positioned at an elevation such that refrigerant vapor path to and from the absorber-generators to the evaporator is entirely below the level of the vapor connection to the absorber generator.

It is a further object of the invention to provide an intermittent absorption refrigerating apparatus having a cooling system for the absorber-generators in which the heat rejecting element of the cooling system is positioned at an elevation below the elevation of the absorber generator.

It is a further object of the invention to provide an absorption refrigerating apparatus of the intermittent type so constructed and arranged that the entire refrigerating mechanism may be assembled and tested in conjunction with a window opening filling panel of the cabinet before final assembly with the cabinet.

It is a further object of the present invention to provide an absorption refrigerating apparatus of the intermittent type having a cooling system for the absorber-generator in which the location of the heat rejecting elements is substantially independent of the location of the absorber-generators.

Other objects and advantages of the invention will become apparent as the description proceeds when taken in connection with the accompanying drawings, in which:

Figure 1 is a schematic view of a system embodying the present invention.

Figure 2 is a fragmentary view of an evaporator structure taken on the line 2—2 of Figure 4.

Figure 4:
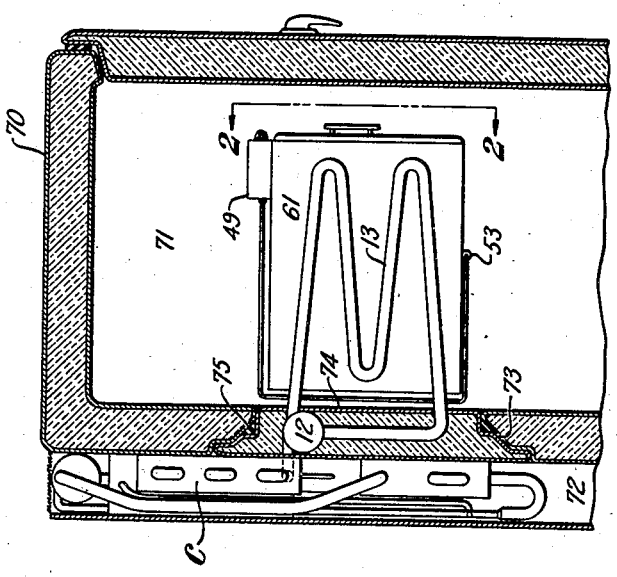
Figure 4 is a side elevational view partly in section showing the apparatus assembled with a cabinet structure.

Referring now to the drawings in detail and first to Figure 1 thereof, it will be seen that the invention comprises two distinct intermittent refrigerating systems which are integrated through a control mechanism and a cooling system for the absorber generator. Since the refrigerating systems are identical the reference characters applied to the left hand system, as viewed in Figure 1, are distinguished by a prime when applied to the right hand. Only one refrigerating system will be described in detail as the systems are exact duplicates.

The refrigerating system per se comprises an absorber-generator A, a tubular air cooled condenser C, and an evaporator E which are serially connected in the order named; that is, the upper portion of the absorber-generator is connected to the upper end of the condenser C by a downwardly sloping conduit 10 and the bottom of the condenser C is connected by a conduit 11 to a reservoir 12 which forms part of the evaporator. The evaporator also includes the sinuous conduit 13 connected at its ends to the reservoir 12, one end of the conduit being connected to the lower portion of the reservoir and the other end to the upper portion of the reservoir.

The absorber-generator per se may be of a known type, for example such as that illustrated in British Patent No. 530,061, complete specification accepted December 4, 1940.

The absorber-generator per se comprises an outer chamber or casing 14 housing the absorbent material which is preferably a dry salt such as strontium chloride, strontium bromide, calcium chloride, magnesium chloride or a similar material. The casing 14 is traversed by a jacket 15 for a cooling medium which serves to remove the heat of absorption from the absorber-generator during the absorbing cycle. A heating duct or flue 16 extends through the central portion of the jacket 15.

The absorber-generator will be charged with salt and a suitable refrigerant, such as ammonia, which the absorbent salt will absorb. In operation of the device the absorber-generator will be heated which will cause the salt to release absorbed refrigerant. The refrigerant vapor will then flow through conduit 10 into the condenser C where the same will be condensed into the liquid state by heat exchange by atmospheric air. The liquid formed in the condenser C will then drain by gravity into the vessel 12. After the salt has been discharged the supply of heat to the absorber generator will be discontinued and the same will then be cooled by a cooling system to be described hereinafter. Cooling of the salt will cause the same to reabsorb ammonia which will result in the evaporation of liquid refrigerant in the evaporator E and the resulting vapor will be absorbed in the salt after which the above cycle may be repeated to produce a continuous refrigerating effect.

In the evaporator E the refrigerant liquid will flow into the lower portion of the sinuous conduit 13 from the vessel 12 where the same will be partially vaporized and the resulting vapor will flow upwardly through conduit 13 and discharge into the upper portion of vessel 12. This action will produce a continuous circulation of liquid refrigerant through the conduit 13 due to vapor lift action. The continual circulation of refrigerant liquid in the evaporator by vapor lift action maintains the inner walls of the conduit 13 substantially continuously wet with refrigerant liquid and increases the heat absorptive capacity of the evaporator.

The absorber-generator of each system contains a cooling fluid jacket 15, 15'. A heat rejecting element 20 of the tubular air cooled type is provided for rejecting heat from both absorber generators. The upper portion of the heat rejecting element 20 is connected by a conduit 21 to the upper gas containing space of a cooling fluid reservoir 22 which is positioned at an elevation considerably above the elevation of the heat rejecting element 20. The lower portion of the vessel 22 is drained by a conduit 24 containing a valve 25 to be described hereinafter. The conduit 24 discharges into a valve chamber 26 which encloses a snap-acting two-way valve mechanism 27. Pipes 28 and 29 connect the valve chamber 26 with the lower end of the cooling jackets 15 and 15', respectively. Vapor formed in the cooling jacket 15 by heat of absorption is removed from the upper portion thereof by means of a conduit 30 which joins the lower portion of a vapor lift conduit 31. The lower end of the conduit 31 is connected to the lower end of the heat rejecting element 20 by a U-shaped liquid seal trap 32 and the upper end of the conduit 31 opens into the upper gas containing space of the vessel 22. The upper portion of the heating jacket 15' is provided with a vapor and liquid removal pipe 33 which connects to the conduit 30 adjacent its lower portion.

Vapor formed in either cooling jacket passes through the conduits 30 or 33 into the vapor lift conduit 31 and serves to elevate condensate supplied to the conduit 31 from the heat rejecting element 20 upwardly into the vessel 22. The separating baffle 34 insures precipitation of the liquid and the resulting vapor then flows through the conduit 21 into the heat rejecting element 20 where the same is condensed in the liquid phase.

The snap-acting two-way valve mechanism 27 is provided with an actuating arm 36 which extends through a flexible seal 37 in one wall of the valve chest 26. The actuating element 36 is positioned to engage the actuating element 38 of a snap-acting switch mechanism 39. The switch mechanism 39 includes a movable two point contact 40 which in the position shown will close a circuit between the left hand contacts 41 and in its opposite position will close the circuit between the contacts 42. The upper contacts 41 and 42 are connected by wires 43 and 44, respectively, to heating elements, not shown, positioned in the heating ducts 16 and 16', respectively. The heating elements for the absorber generators A and A' are connected to the line wire 45 by conduits 46 and 47, respectively. The line wire 48 is connected to a thermostatic switch 49 which in turn is connected by the conductor 50 to the lower ones of the contacts 41 and 42. Current is applied to the thermostatic valve 25 by a conductor 51 which is connected to the conductor 50. The valve 25 is also connected to the line wire 45 by a conductor 52.

The thermostatic switch mechanism 49 is of a known type and is provided with a thermostat bulb 53 which will be positioned on the evaporator casing as illustrated in Figure 2.

The control actuating element 36 is arranged to be operated by a pair of thermostatic bellows elements 55 and 56. The bellows elements 55 and 56 are each provided with capillary conduits 57 and 58, respectively, which terminate in thermostatic bulbs 59 and 60, respectively. The bulb 59 is in contact with the absorber-generator A and the bulb 60 is in contact with the absorber-generator A'. Thus, when either absorber-generator is on the absorption cycle its temperature will be lower and its associated bellows element will be collapsed, as is indicated for the bellows element 55 in Figure 1. However, when the temperature of the absorber-generator reaches a certain predetermined value, the associated bellows element will expand as is indicated by the bellows element 56 in Figure 1 and will actuate the arm 36 which in turn will actuate the switch 39 and the valve mechanism 26.

When the apparatus is initially charged and placed in operation both absorber generators will be cold and both bellows will be contracted. Under these conditions the snap acting mechanism will be in either one of its two possible positions. Heat will be applied to one generator and will discharge the same of absorbed refrigerant. There will be no cooling of the other absorber-generator as the same will have all the charge in its system absorbed. When the heated absorber-generator is substantially discharged its temperature will begin to rise rapidly and will quickly reach the temperature for which the associated thermostat is set. When this temperature is reached the thermostat will expand and contact the actuating arm 36 and actuate the snap acting valve and switch mechanism. It will be noted from Figure 1 that the valve and switch mechanisms are so coordinated with each other that the cooling fluid system is open to one absorber generator while the other absorber generator is energized for heating operation. Now when the thermostat actuates the switch-over devices cooling fluid will flow quickly through the conduits 24 and 28 and 29 from the vessel 22 and will quickly cool down the absorber-generator to which it is admitted. This will cause the salt within the cooled absorber-generator to begin immediate absorption of refrigerant vapor with consequent immediate production of refrigeration in its associated evaporator element. The vapor produced in the cooling jacket by the heat of absorption will then pass out of the cooling jacket and will lift previously condensed vapor to the cooling medium collection vessel in a manner heretofore described. This operation will continue with each absorber-generator alternately operating on the generating and absorption cycles until the demand for refrigeration is met, at which time the thermostatic switch 49 will be open circuited and will de-energize the system.

Referring now to Figure 2 the manner in which the evaporators are associated with a freezing compartment is illustrated. It will be there seen that the freezing compartment comprises a metallic shell 61 provided with ice tray supporting shelves 63. The evaporators E and E' are placed upon and are in heat exchange relationship with opposite side walls of the casing 61 whereby they serve to cool the same. If desired, the lower portion of the casing just above the thermostatic element 53 may contain a quantity of heat absorptive material which also has an appreciable heat conductivity so as to transfer cold from the operative evaporator element. The thermostatic switch 49, which is of the adjustable type, will be positioned on the top wall of the evaporator chamber 61 in order that the same may be readily accessible for adjustment by the housewife.

Figure 3:
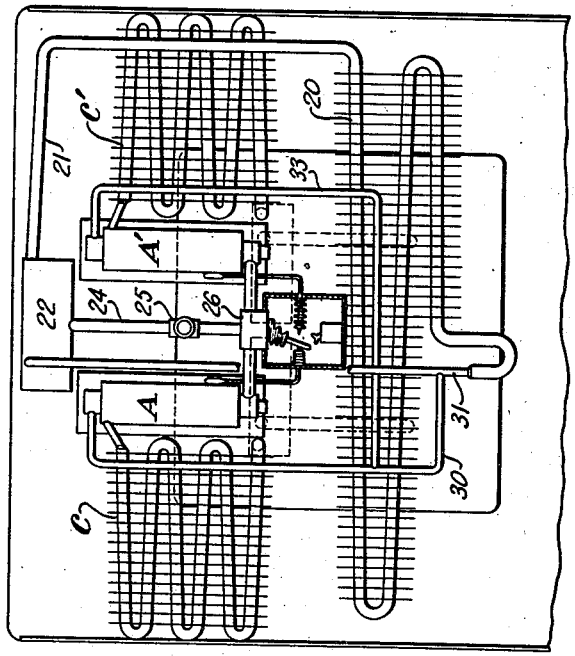
Figure 3 is a rear elevational view showing the apparatus of the present invention assembled with a cabinet structure.

Referring now to Figures 3 and 4 the manner in which the above described mechanism is associated with a cabinet structure is illustrated. The insulated cabinet 70 is provided with an insulated refrigerating chamber 71 and a rear air cooling and machinery receiving chamber 72. The rear wall of the cabinet 70 is provided with an opening 73 which is closed by a suitable insulated panel 74. A gasket 75 is provided to seal the joint between the cabinet structure and the panel 74.

The refrigerating apparatus is associated with the panel 74 as is illustrated in Figures 3 and 4; that is, with the evaporator on the forward side of the panel and the remaining apparatus on the rear side so that the evaporator structure may extend into the refrigerating chamber 71 and the remaining apparatus will be positioned in the vertically extending mechanism chamber and air flue 72. The panel 74 and the associated refrigerating apparatus may be assembled with the refrigerating cabinet in any desired manner as by directly securing the panel 74 and refrigerating apparatus to the framework of the cabinet. The refrigerating apparatus per se is sufficiently rigid so that the same does not require the provision of an auxiliary supporting framework.

The absorber generators and condensers are positioned above the evaporators and the condensers discharge directly into the reservoirs 12, 12' which are embedded in the insulation of the panel element 74 as are the vertically downwardly extending conduits which connect the reservoirs to the lower ends of the coils 13, 13'. By this arrangement circulation of refrigerant downwardly from the reservoir 12 and upwardly through the conduit 13, 13' is assured due to the fact that heat will be supplied to the conduit 13 and will not be supplied to the connection thereto which is embedded in the insulation of the panel element.

The element 20 is positioned below the refrigerating apparatus per se so that the same receives the coolest air available for cooling purposes and very efficiently cools its associated absorber-generator. The condensers C and C' are positioned at an elevation substantially co-extensive with the absorber generators and are laterally spaced from each other in the flue so that the same may operate independently and to be cooled by independent streams of cooling air. This arrangement of the condensers is preferred but they may be extended entirely across the mechanism chamber in the manner in which the element 20 extends thereacross. In the event that the condensers are extended entirely across the back wall of the cabinet the absorber generators may be arranged horizontally above the level of the condenser.

In the illustrated embodiment of the invention the heat rejecting element 20 is positioned immediately below the casing housing the control mechanism. However, it may be positioned at a lower level and beneath the refrigerated compartment if desired, though this is a less compact arrangement.

It is characteristic of the present invention that the quantity of liquid in the reservoir 22 is sufficient to cool the absorber-generator with extreme rapidity when the valve 26 is actuated to admit cooling fluid to either absorber generator at the end of a generating period. This action causes immediate absorption of refrigerant vapor by the absorber-generator and prevents a period of no refrigeration production at the switch-over period.

The apparatus has been illustrated and described for use with electrical heating; however, it is within the scope of the invention to use combustible fuel, such as gas, to heat the absorber generators. In this event the arm 36 would operate a snap acting gas valve similar in structure to the valve mechanism 26 and the control mechanism would operate on a gas valve positioned in the supply line ahead of the snap acting mechanism. An example of such a construction will be found in U. S. Letters Patent 2,228,343, dated January 14, 1941. Of course in the event such a construction were embodied in the present apparatus the electrical connections disclosed in the aforementioned patent would be unnecessary and could be eliminated.

While the invention has been illustrated and described herein in considerable detail, various changes may be made in the form, construction and arrangement of parts without departing from the spirit of the invention or the scope of the appended claims.

I claim:

1. Refrigerating apparatus including a pair of intermittent refrigerating systems each including an absorber-generator, a condenser and an evaporator connected in circuit, said condensers and said evaporators being arranged with respect to each other and to said absorber-generators to prevent gravity flow of liquid refrigerant into said absorber-generators, a cooling system for said absorber-generators including a heat rejecting part, a heat absorbing part in heat exchange with each absorber-generator, a gas and liquid separating chamber, means for conveying condensate from said separating chamber to each absorber-generator, a vapor lift pump for conveying condensate from said heat rejecting part to said separating chamber, means for conveying vapor from said separating chamber to said heat rejecting part, means for conveying vapor from each of said heat absorbing parts to said vapor lift pump, means for heating said absorber-generators, and control means arranged to govern said heating means and said cooling system to apply heat to one absorber-generator to cool the other absorber-generator.

2. In a refrigerator, a cabinet structure including an insulated refrigerating chamber and a mechanism chamber and cooling air passageway extending along a vertical wall of said refrigerating chamber, an intermittent absorption refrigerating apparatus associated with said cabinet structure including an evaporator in said refrigerating chamber, an absorber-generator in said mechanism chamber, a tubular air cooled condenser in said mechanism chamber, conduit means having a downward slope for conducting refrigerant vapor from said absorber-generator to said condenser, conduit means for conducting refrigerant liquid from said condenser to said evaporator, means for heating said absorber-generator, and a vaporization-condensation cooling system for cooling said absorber-generator including a vaporizing part in heat exchange relation with said absorber-generator and a tubular air cooled condensing element positioned in said mechanism chamber below said absorber-generator.

3. In a refrigerator, a cabinet structure including an insulated refrigerating chamber and a mechanism chamber and cooling air passageway extending along a vertical wall of said refrigerating chamber, an intermittent absorption refrigerating apparatus associated with said cabinet structure including an evaporator in said refrigerating chamber, an absorber-generator in said mechanism chamber, a tubular air cooled condenser in said mechanism chamber, conduit means having a downward slope for conducting refrigerant vapor from said absorber-generator to said condenser, conduit means for conducting refrigerant liquid from said condenser to said evaporator, means for heating said absorber-generator, means for cooling said absorber-generator including a tubular air cooled condensing element positioned in said mechanism chamber below said absorber-generator, and a circulating means for cooling medium operated by vapor of cooling medium produced by rejection of heat from said absorber-generator.

4. In a refrigerator, a cabinet structure having an insulated refrigerating chamber and a vertically extending mechanism chamber and air duct extending along a wall of said refrigerating chamber, a removable panel in said wall of said refrigerating chamber; refrigerating apparatus associated with said cabinet structure including a pair of intermittent absorption refrigerating systems each including an absorber-generator, a tubular air cooled condenser and an evaporator connected in circuit; said absorber-generators being positioned in said mechanism chamber, said evaporators being positioned in said refrigerating chamber in front of said panel and below the upper portion of said absorber-generators, said condensers being positioned in said mechanism chamber and extending from a point below the upper portions of said absorber-generators to said evaporator, means for heating said absorber-generators, and a cooling system for cooling said absorber-generators comprising parts in heat exchange relation with each absorber-generator, an air cooled condensing element positioned below said absorber-generators, a reservoir above said absorber-generators, a vapor lift pump for elevating condensate from said condensing element to said reservoir, means for conducting vapor from each of said heat rejecting parts to said vapor lift pump, and means for conducting vapor from said reservoir to said condensing element.

5. In a refrigerator, a cabinet structure having an insulated refrigerating chamber and a vertically extending mechanism chamber and air duct extending along a wall of said refrigerating chamber, a removable panel in said wall of said refrigerating chamber; refrigerating apparatus associated with said cabinet structure including a pair of intermittent absorption refrigerating systems each including an absorber-generator, a tubular air cooled condenser and an evaporator connected in circuit; said absorber-generators being positioned in said mechanism chamber, said evaporators being positioned in said refrigerating chamber in front of said panel and below the upper portion of said absorber-generators, said condensers being positioned in said mechanism chamber and extending from a point below the upper portions of said absorber-generators to said evaporators, means for heating said absorber-generators, a cooling system for said absorber-generators including heat absorbing parts in heat exchange relation with each absorber-generator and a tubular air cooled condensing element positioned below said absorber-generators in said mechanism chamber, vapor lift means for elevating condensate from said condensing element to said heat absorbing parts, means for introducing vapor produced in said heat absorbing parts into said vapor lift means, and means for conducting vapor from said vapor lift means to said condensing element.

6. In an intermittent absorption refrigerating apparatus having a pair of absorber-generators which are alternately heated and cooled; a cooling system for said absorber-generators including heat absorbing parts in heat exchange relation with said absorber-generators, an air cooled heat rejecting part positioned below said absorber-generators, a reservoir for a cooling medium positioned above said absorber-generators, means for conveying cooling medium from said reservoir to said heat absorbing parts, a vapor lift pump for elevating cooling medium from said heat rejecting part to said reservoir, means for introducing vapor from each of said heat absorbing parts into said vapor lift pump, and means for conveying vapor from said reservoir to said heat rejecting part.

7. Intermittent absorption refrigerating apparatus having a pair of absorber-generators which are alternately heated and cooled, a cooling system for said absorber-generators including heat absorbing parts in heat exchange relation with said absorber-generators, an air cooled heat rejecting part positioned below said absorber-generators, a reservoir for a cooling medium positioned above said absorber-generators, means for conveying cooling medium from said reservoir to said heat absorbing parts, a vapor lift pump for elevating cooling medium from said heat rejecting part to said reservoir, means for introducing vapor from each of sid heat absorbing parts into said vapor lift pump, means for conveying vapor from said reservoir to said heat rejecting part, and thermostatic control means arranged to direct the cooling medium discharged from said reservoir into a selected one of said absorber-generators.

8. In a refrigerator, a cabinet structure having an insulated refrigerating chamber and a vertically extending mechanism chamber and air duct extending along a wall of said refrigerating chamber, a removable panel in said wall of said refrigerating chamber of a size sufficient to allow an evaporator to be inserted into said refrigerating chamber through the opening receiving said panel, refrigerating apparatus associated with said cabinet structure including a pair of intermittent absorption refrigerating systems each including an absorber-generator, a tubular air cooled condenser and an evaporator connected in circuit; said absorber-generators being positioned in said mechanism chamber, said evaporators being positioned in said refrigerating chamber in front of said panel and below the upper portion of said absorber-generators, said evaporators including reservoirs embedded in the insulation of said panel, said condensers being positioned in said mechanism chamber and extending from a point below the upper portions of said absorber-generators to said evaporators; means for heating said absorber-generators; a cooling system for said absorber-generators comprising a single heat rejecting element positioned below said absorber-generators, and means for circulating cooling medium from said heat rejecting part in heat exchange with said absorber-generators arranged to be operated by heat rejected from either absorber-generator; and control means arranged to govern said heating means and said cooling system so that one absorber-generator is being heated while the other is undergoing cooling.

ALFRED G. GROSS.